United States Patent Office 3,351,579
Patented Nov. 7, 1967

3,351,579
WATER-SOLUBLE CATIONIC AZO DYESTUFFS
Edwin Baier, Frankfurt am Main, Germany, assignor to Farbwerke Hoechst Aktiengesellschaft vormals Meister Lucius & Bruning, Frankfurt am Main, Germany, a corporation of Germany
No Drawing. Filed Oct. 1, 1963, Ser. No. 312,865
Claims priority, application Germany, Oct. 3, 1962, F 37,956
2 Claims. (Cl. 260—158)

The present invention is concerned with water-soluble cationic dyestuffs and a process for preparing them; it relates especially to water-soluble cationic dyestuffs of the following general Formula 1

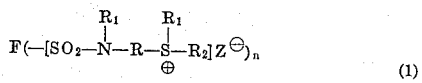

(1)

in which F represents the radical of a mono- or disazo-dyestuff molecule, which does not contain any ionic groups imparting solubility in water, R represents an alkylene group, $R_1$ and $R_2$ each represent an alkyl group, $Z^\ominus$ represents an anion and $n$ stands for an integer from 1 to 2.

It has been found that water-soluble cationic dyestuffs of the following general Formula 1

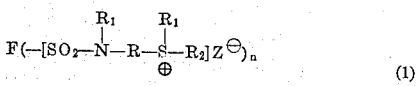

(1)

in which F represents the radical of a mono- or disazodyestuff molecule, which does not contain any ionic groups imparting solubility in water, R represents an alkylene group, $R_1$ and $R_2$ each represent an alkyl group, $Z^\ominus$ represents an anion and $n$ stands for an integer from 1 to 2, can be prepared by reacting a dyestuff of the following general Formula 2

(obtainable by hydrolyzing a dyestuff of the following formula

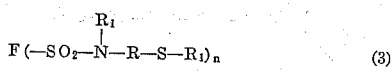

$F(-SO_2-NH-R-SH)_n$ (2)

in which F, R and $n$ have the meanings given above, in an aqueous alkaline solution, suitably in an aqueous sodium hydroxide solution, with an alkylating agent, to yield the corresponding dyestuff thioether of the following general Formula 3

$F(-SO_2-N-R-S-R_1)_n$ (3)

in which F, R, $R_1$ and $n$ have the meanings given above, drying the resulting compound and reacting it again with an alkylating agent.

The reaction of the starting dyestuff of general Formula 2 given above with an alkylating agent, for example methyl iodide, dimethyl sulfate or diethyl sulfate, in an aqueous alkaline solution is suitably carried out at a temperature within the range of about 40° to 80° C. The dyestuff thioether thus obtained is separated from the aqueous phase, washed with water until neutral and dried, the drying being suitably carried out at a temperature within the range of about 40° to 100° C. The dyestuff thioether which has thus been freed from water is introduced, while stirring, into the alkylating agent or into a mixture of an alkylating agent with an organic solvent, for example dimethyl formamide, benzene, toluene, or nitrobenzene, and reacted therein for 1 to 3 hours at a temperature within the range of about 80° to 120° C., preferably at about 100° C.

The dyestuffs corresponding to general Formula 2 indicated above, which are used as starting compounds, can be prepared by subjecting the corresponding dyestuffs which have the following general Formula 4

$F(-SO_2-NH-R-SSO_3H)_n$ (4)

to a hydrolysis in an acid medium or by splitting the corresponding dyestuffs of the following general Formula 5

(5)

in an alkaline medium. The dyestuffs of Formula 5 can be prepared, for example, by coupling diazotized 4-aminobenzene - sulfonyl - amino - ethyl-isothiuronium salts which are obtainable by the addition of thiourea to 4 - amino - benzene-sulfethylene-imide in an acid medium, with coupling components that do not contain any group imparting solubility in water.

The dyestuffs according to the invention are obtained in a good to very good yield and can well be used for dyeing animal or vegetable fibrous materials. The dyeings produced on the said materials are distinguished by good wet-fastness properties and clear brilliant tints.

The following examples serve to illustrate the invention but they are not intended to limit it thereto, the parts being by weight unless otherwise stated and the relationship of parts by weight to parts by volume being the same as that of the kilogram to the liter.

EXAMPLE 1

15 parts of the azodyestuff of the following formula

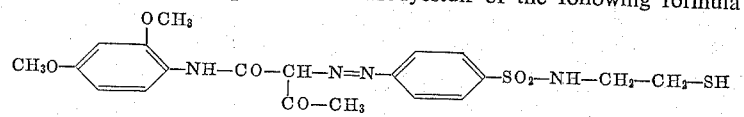

in an alkaline medium, the last-mentioned dyestuff being obtainable by coupling diazotized 4-amino-benzene-sul-

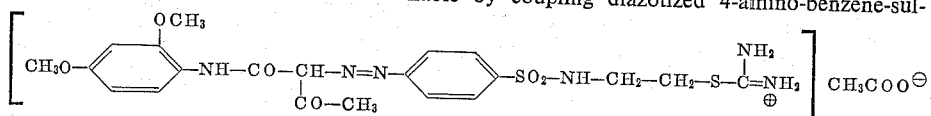

fonyl-aminoethyl-isothiuronium acetate with N-acetoacetyl - 4 - amino - 1,3 - dimethoxy-benzene, the said diazotized 4 - amino - benzene - sulfonyl - aminoethyl-isothiuronium acetate being obtainable by the addition reaction of thiourea with 4 - aminobenzene - sulfethylene imide in an acetic acid medium) were dissolved in 80 parts by volume of 2 N-sodium hydroxide solution.

15 parts of dimethyl sulfate were introduced, while stirring, at 60° C. into the solution that had been prepared. After the introduction was terminated stirring was continued for 1 hour at 60° C. and then for another 30 minutes at 70° C. The dyestuff thioether that had precipitated was filtered off, washed with hot water until neutral and dried at 80° C.

8 parts of the water-insoluble dyestuff thioether so obtained were slowly introduced at 80° C. into 30 parts of dimethyl sulfate. After the addition was terminated the reaction mixture was stirred for 3 hours at 80° C., then cooled to room temperature and mixed with 400 parts by volume of isopropanol.

The dyestuff that had precipitated was filtered off, dissolved in 200 parts by volume of water and precipitated with 6 parts of sodium chloride. The resulting cationic dyestuff of the formula

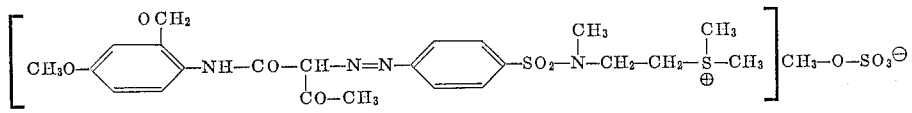

was an oragne-colored powder which dissolved well in water and dyed animal and vegetable fibrous materials brilliant yellow tints. The dyeings produced with this dyestuff had good wet-fastness properties.

EXAMPLE 2

12 parts of the disazodyestuff of the formula

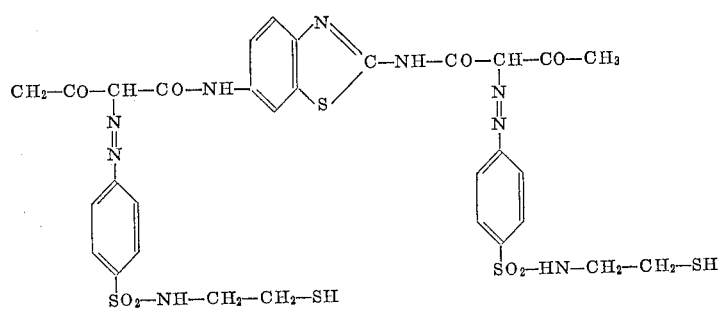

were dissolved in 80 parts by volume of 2 N-sodium hydroxide solution. (This dyestuff is obtainable by subjecting a dyestuff of the formula

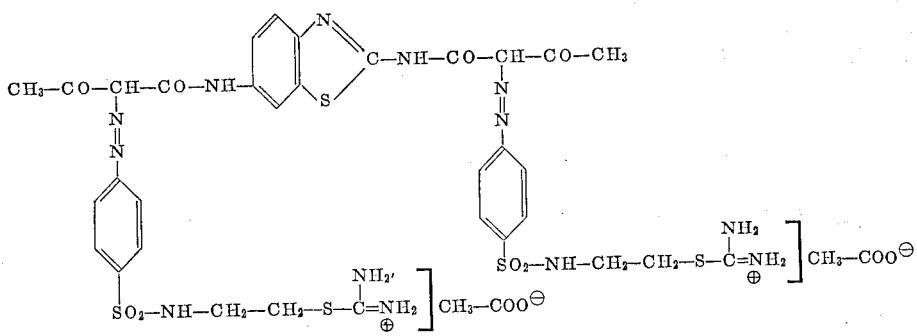

to a hydrolysis in an alkaline medium, the last-mentioned dyestuff being obtainable by coupling 2 mols of diazotized 4-amino-benzene-sulfonyl-aminoethyl-isothiuronium acetate which may be prepared by the addition reaction of thiourea with 4-aminobenzene-sulfethylene-imide in an acetic acid medium, with 1 mol of 2.6-bis-(aceto-acetyl-amino)-benzothiazole). 15 parts of dimethyl sulfate were introduced at 60° C., while stirring, into the solution that had been prepared. After the introduction was terminated stirring was continued for 1 hour at 60° C. and then for another 30 minutes at 70° C. The dyestuff thioether that had formed and precipitated was filtered off, washed with hot water until neutral and dried at 80° C.

9 parts of the water-insoluble dyestuff thioether thus obtained were reacted for 1 hour at 100° C. with 40 parts of dimethyl sulfate. The reaction mixture was then allowed to cool and 200 parts by volume of isopropanol were added. The dyestuff that had formed and precipitated was filtered off, washed with isopropanol and dried at 40° C.

The cationic dyestuff of the formula

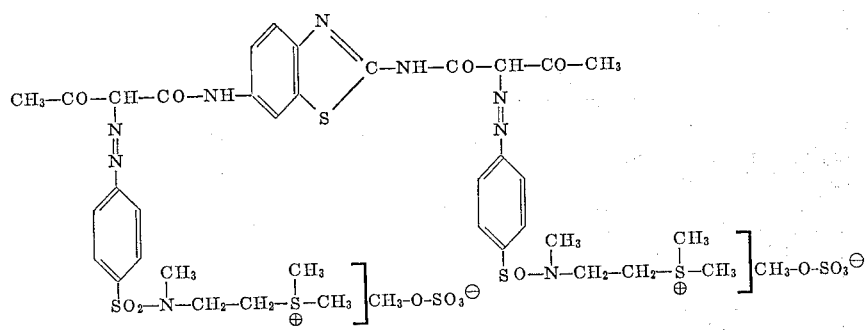

so obtained was a brown powder which dissolved well in water and dyed animal and vegetable fibrous materials clear greenish yellow tints. The dyeings produced with this dyestuff had good wet-fastness properties.

I claim:
1. Dyestuff of the formula
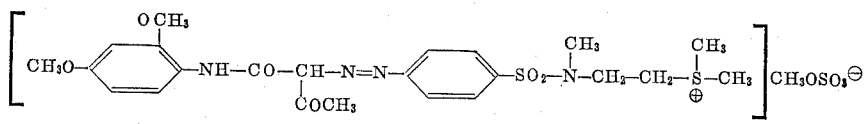
2. Dyestuff of the formula
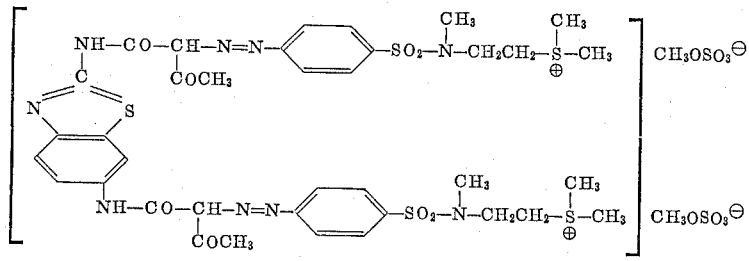
References Cited
UNITED STATES PATENTS
2,201,814  5/1940  Evans et al. -------- 260—609
FOREIGN PATENTS
1,240,748  8/1960  France.
CHARLES B. PARKER, *Primary Examiner.*
D. PAPUGA, *Assistant Examiner.*